(12) United States Patent
Desportes et al.

(10) Patent No.: US 9,663,590 B2
(45) Date of Patent: May 30, 2017

(54) PROCESS FOR THE (CO-)POLYMERISATION OF OLEFINS

(71) Applicant: INEOS EUROPE AG, Rolle (CH)

(72) Inventors: Serge Desportes, Simiane-Collongue (FR); Claudine Viviane Lalanne-Magne, Saint Mitres les Remparts (FR); Renaud Viguier, Sete (FR)

(73) Assignee: INEOS EUROPE AG, Rolle (CH)

( * ) Notice: Subject to any disclaimer, the term of this patent is extended or adjusted under 35 U.S.C. 154(b) by 0 days.

(21) Appl. No.: 14/914,281

(22) PCT Filed: Sep. 3, 2014

(86) PCT No.: PCT/EP2014/068686
§ 371 (c)(1),
(2) Date: Feb. 25, 2016

(87) PCT Pub. No.: WO2015/036296
PCT Pub. Date: Mar. 19, 2015

(65) Prior Publication Data
US 2016/0200837 A1   Jul. 14, 2016

(30) Foreign Application Priority Data
Sep. 10, 2013 (EP) .................... 13183811

(51) Int. Cl.
| | | |
|---|---|---|
| *C08F 2/00* | (2006.01) | |
| *C08F 4/52* | (2006.01) | |
| *C08F 110/06* | (2006.01) | |
| *C08F 110/02* | (2006.01) | |
| C08F 10/02 | (2006.01) | |
| C08F 10/06 | (2006.01) | |

(52) U.S. Cl.
CPC .............. *C08F 2/008* (2013.01); *C08F 2/005* (2013.01); *C08F 10/02* (2013.01); *C08F 10/06* (2013.01); *C08F 2410/02* (2013.01); *Y02P 20/582* (2015.11)

(58) Field of Classification Search
CPC .......... C08F 2/005; C08F 2/008; C08F 10/00; C08F 2/34; C08F 2410/02; C08F 10/06; C08F 20/582; C08F 10/02
USPC ............................. 526/62, 78, 185, 351, 352
See application file for complete search history.

(56) References Cited

U.S. PATENT DOCUMENTS

| | | | |
|---|---|---|---|
| 5,077,358 A | 12/1991 | Durand et al. | |
| 5,541,269 A * | 7/1996 | Niwa | ...................... C08F 10/00 526/348 |
| 8,148,481 B2 | 4/2012 | Hussein | |

FOREIGN PATENT DOCUMENTS

| | | |
|---|---|---|
| EP | 0 604 993 A1 | 7/1994 |
| EP | 0 604 994 A1 | 7/1994 |
| EP | 0 605 002 A1 | 7/1994 |
| WO | WO 94/28032 A1 | 12/1994 |

* cited by examiner

*Primary Examiner* — William Cheung
(74) *Attorney, Agent, or Firm* — Nixon & Vanderhye P.C.

(57) ABSTRACT

Process for the polymerization or copolymerization of olefins by bringing the olefins into contact with a catalyst under polymerization or copolymerization conditions in a reactor containing a charge powder. The process includes, prior to introducing the catalyst into the reactor, introducing a scavenger into the reactor which reacts with catalyst poison present. The scavenger is added to the reactor until the charge powder contains a remaining amount of scavenger of between 0.1 and 2.5 moles per ton of charge powder.

36 Claims, No Drawings

PROCESS FOR THE (CO-)POLYMERISATION OF OLEFINS

This application is the U.S. national phase of International Application No. PCT/EP2014/068686 filed Sep. 3, 2014 which designated the U.S. and claims priority to European Patent Application No. 13183811.2 filed Sep. 10, 2013, the entire contents of each of which are hereby incorporated by reference.

The present invention relates to a process for improving the polymerisation or copolymerisation of alpha-olefins. More particularly, the present invention relates to a process for improving the polymerisation or copolymerisation of alpha-olefins in a polymerisation reactor. Even more particularly, the present invention relates to a process for improving cleaning and/or drying of a polymerisation reactor by adding a compound that reacts with the catalyst poisons (e.g. water) to scavenge it.

The production of polymer powder by polymerisation reactions of monomers in the presence of catalysts is well-known. For example, processes are known and widely operated commercially using both gas phase fluidised bed reactors and slurry phase reactors.

In a slurry polymerisation process, for example, the polymerisation is conducted in a stirred tank or, preferably, a continuous loop reactor in which a slurry of polymer particles in a liquid medium comprising hydrocarbon diluent is circulated. During the course of polymerisation, fresh polymer is generated by the catalytic polymerisation of monomer and polymer product is removed from the reactor by removing a portion of the slurry.

The withdrawn polymer is treated to separate diluent, reactants and other constituents of the reaction mixture which are entrained with or absorbed on the withdrawn polymer, in a process which is generally referred to as degassing. The separated reactants are then recycled to the reactor.

In the gas phase fluidised bed polymerisation process, a bed of growing polymer particles is maintained in a fluidised state by an ascending stream of a fluidising gas comprising monomer and other reactants. Polymerisation may be performed continuously, the catalyst system being introduced into the reactor continuously or in sequence.

The fluidising gas exiting the top of the reactor is recycled to the base of the reactor by an external recycle loop, usually involving at least one step by which the gas is cooled.

The polymer produced may be withdrawn from the reactor continuously or in sequence to thereby maintain the volume and/or height of the bed of fluidised polymer particles in the reactor. The withdrawn polymer is treated to separate reactants and other constituents of the reaction mixture which are entrained with or absorbed on the withdrawn polymer, in a process which is generally referred to as degassing. The separated reactants are then recycled to the reactor.

The start-up of the polymerisation reaction in the gas phase is generally performed by introducing the catalyst system into a reactor fed with reaction gas mixture, and also containing a charge powder. This charge powder, consisting of solid particles, such as particles of polyolefin, is used to form the initial bed at the moment when the polymerisation reaction starts up, favouring in particular a suitable dispersion of the catalyst system in the reaction medium.

In such the industrial processes for the production of polyolefins, it may be necessary to stop the polymerisation reaction temporarily in order to be able to carry out various operations for maintaining or cleaning the reactor. Impurities ("catalyst poisons") such as water and/or oxygen may be introduced during these various operations into the polymerisation apparatus when the reaction is restarted. In the particular case of a gas phase fluidised bed process such impurities may also be introduced with the charge powder introduced into the reactor when the reaction is restarted.

Under these conditions, the polymerisation reaction often commences several hours after the commencement of introduction of the catalyst system into the reactor. The actual start-up of polymerisation consequently takes place in the presence of a relatively high concentration of catalyst system in the reactor, so that the polymerisation reaction speed may increase rapidly and abruptly, with the risk of forming localized hot spots and the bursting of polymer grains into fine particles. These localized hot spots may lead to the formation of agglomerates and sheeting of the polymer inside the reactor, and are liable to cause the stoppage of the polymerisation reaction.

Moreover, in the special case of polymerisation in a fluidized bed gas phase reactor, the fine particles, formed by the bursting of the grains making up the bed, are inevitably entrained out of this bed, which gives rise to a continuation of the polymerising reaction outside the reactor.

Moreover, the considerably increased concentration of catalyst system in the fluidized bed at the moment when the reaction starts up appreciably modifies the conditions of development of the polymerisation or copolymerisation, so that the polymers or copolymers produced in the initial phase of the reaction have properties notably different from those of the desired products, especially as regards density, comonomer content, melt index, crystallinity and content of catalyst residues. It is then observed that it is necessary to produce a relatively high quantity of polyolefins before obtaining the product of desired quality.

It is thus important to clean (e.g. dry) the reactor before starting the polymerisation. The removal of catalyst poisons is considered as a mandatory feature of the polymerisation reactions. For example, water can be present as a physically or chemically absorbed or adsorbed species throughout the polymerisation system, and it can also exist as free water in pockets and/or dead areas of the polymerisation reactor system such as in unmixed or unheated nozzles and flanges.

The prior art includes many methods which have been applied to gas phase fluidised bed polymerisation reactors with and/or without a seed bed present to minimise the amount of catalyst poisons present in the polymerisation reactor system.

These can include pressure purging with an inert gas such as nitrogen at an elevated temperature, or flow purging the reactor system with nitrogen or other suitable inert gases at a reduced pressure. A vacuum can be placed on the reactor system, preferably at elevated temperature, to reduce the level of water. The vacuum can be applied repeatedly if desired.

Typical vacuum drying can use pressures from just below atmospheric to about 50 mm Hg, and preferably to about 5 to 10 mm Hg. Such high vacuums are difficult but not impossible to achieve for large scale industrial equipment. Vacuums in the range of about 100 to 750 mm Hg aid in the removal of liquid water from the reaction system. The higher vacuums are required to remove adsorbed water from the reactor surfaces. The reactor may first be heated under pressure and then vented to near atmospheric pressure and the vacuum applied while the reactor is still hot in order to improve the drying step. Ideal temperatures are in the range of about 40 to 130° C. The drying is improved as the time duration of the vacuum increases and is typically in the range of about 5 minutes to 2 hours. Insulating the reactor or the external application of heat to the reactor vessel aid in maintaining a high temperature as the system is vacuum dried.

Hydrocarbons such as ethane, ethylene, propane, propylene, butane, isobutane, 1-butene, n-pentane, isopentane, n-hexane and 1-hexene have been introduced and circulated in the gaseous state to increase the heat capacity of a circulating medium and thus speed drying. For example, WO2004007571 discloses a process for the polymerisation or copolymerisation in the gas phase of olefin(s) by bringing the said olefins(s) into contact, under polymerisation or copolymerisation conditions in a reactor in which the polymer or the copolymer is maintained in a fluidised bed and/or agitated with mechanical stirring, with a catalyst system, which process comprises a pre start-up operation characterized in that, prior to the introduction of the catalytic system in the reactor, the reactor is subjected to a cleaning treatment comprising the steps of introducing into the reactor an alkane having from 4 to 8 carbon atoms, circulating said alkane across the reactor under pressure and elevated temperature, depressurizing and purging the reactor.

Alkyl aluminium and other alkyl metal compounds such as trimethyl aluminium, triethyl aluminium and diethyl zinc have been introduced to reactor systems in the presence or absence of a seed bed to passivate the system or to serve as scavengers for catalyst poisons before commencing polymerisation. Generally, prior to the introduction of the aluminium alkyl compound, the reactor system is dried to reduce water levels to at least about 1 to 150 ppmv, e.g. to at least about 10 to 150 ppmv (concentration of water in the circulating medium)—usually less than 50 ppmv and sometimes less than 5 ppmv. It is obvious to those skilled in the art that the above procedures can be applied in combination to improve the drying of the reactor. As an example, the reactor may be dried under vacuum prior to the introduction of the aluminium alkyl to reduce the formation of reaction products of the aluminium alkyl and water and thus improve reactor start-up, operability and resistance to fouling and/or agglomerates formation (e.g. sheeting).

For example, EP180420 discloses a process for the start-up of polymerisation in the gas phase by bringing an olefin in contact under polymerisation conditions in a fluidised bed and/or with mechanical stirring with a charge powder, in the presence of a catalyst system of the Ziegler-Natta type, this process being characterized in that the charge powder 5 used is previously dehydrated and subjected to a treatment by bringing the said charge powder into contact with an organoaluminum compound for a period of at least five minutes, so that the polymerisation starts up immediately after the contracting of the olefin with the charge powder in the presence of the catalyst system.

EP605002 relates to a process for the polymerisation of olefins with a vapour phase fluidised bed reactor which comprises the steps of feeding seed polymer particles and the reaction is then started after feeding an organoaluminum compound on a prescribed basis, thereby avoiding the formation of sheet-like polymer in the initial period of the reaction and the lowering of the bulk density of the product polymer.

EP604994 discloses a process for the polymerisation of olefins using a catalyst comprising an organoaluminum compound and a solid catalyst components containing titanium and/or vanadium; and magnesium in a vapor phase fluidised bed, wherein the formation of sheet-like polymer and other abnormal conditions in the initial stage of the polymerisation are avoided by means of previous drying of the reactor by feeding an organoaluminum compound prior to the feeding of seed polymer, the quantity of said organoaluminum compound being calculated by the following equation $A=k \cdot V^{2/3}$ (wherein A is the feed quantity (mol) of the organoaluminum compound, k is a coefficient (mol/m$^2$) in the range from 0.15 to 4, and V is the volume (m$^3$) of the whole system including gas circulation piping).

The drying step can be an expensive and time consuming process, particularly if water has been introduced into the system during shutdown. Such would be the case, for example, if the reactor internals were water-blasted to remove polymer deposits. Experience has shown that water may remain in dead areas such as flanges, tubing or adjacent piping connected to the reactor, and be difficult to remove. Although the reactor is heated during the drying steps, such peripheral areas do not reach the same high temperatures as the main body of the reactor and are more difficult to dry. Heating these areas individually can improve drying but this may prove to be a cumbersome and expensive option with irreproducible results. It is not uncommon for the reactor moisture level to be measured to about 50 ppmv water within a few hours after beginning the drying procedure, and then remain there for several hours or even days. Furthermore, the conventional measurement of the water concentration in the reactor has proven to be unreliable due to these uncontrolled releases of water during the drying stage.

The presence of catalyst poisons (e.g. water) may thus adversely impact polymerisations which employ metallocene, Ziegler-Natta or chromium-based catalysts by the generation of electrical charges in the reactor and reaction medium, leading to sheeting, polymer agglomeration, and/or fouling of the reaction system. The polymerisation may also be retarded by the presence of catalyst poisons (e.g. water), causing the reaction to start slowly and to have decreased catalyst productivity. Consequently, in order to guarantee a complete and satisfactory cleaning/drying of the polymerisation reactor, the man skilled in the art tends to overclean/overdry the reaction system.

In the course of their continuous research for improving the cleaning/drying of the polymerisation reactor systems, the Applicants have found that the overcleaning/overdrying technique could also lead to important operational problems; said problems being very similar to the one experienced when the cleaning/drying is not complete. In other words, as explained hereafter, the excess of catalyst poisons and/or of the corresponding scavengers can lead to serious operational problems.

It is therefore an objective of the present invention to provide a new and improved polymerisation process which solves the above problems.

It has now been found that it is possible to avoid the difficulties mentioned above as well as to bring additional advantages as disclosed hereafter and to obtain the start-up of the polymerisation or copolymerisation reaction immediately after the alpha-olefins have been brought into contact with the catalyst system and a charge powder, without the risk of formation of agglomerates, fouling, sheeting or fine particles, the polyolefins produced during this period of start-up having constant properties and having immediately the desired quality.

An object of the present invention is therefore a process for the polymerisation or copolymerisation of olefins by bringing the said olefins into contact with a catalyst under polymerisation or copolymerisation conditions in a reactor comprising a charge powder, preferably an olefin polymer bed, which process comprises, prior to the introduction of the catalyst into the reactor, the introduction of a scavenger into the reactor which reacts with catalyst poison present, wherein the scavenger is added to the reactor until the charge powder comprises a remaining amount of scavenger comprised between 0.1 and 2.5 moles per ton of charge powder, preferably between 0.3 and 2 moles per ton of charge powder.

Indeed, the Applicants have unexpectedly found that the prior art problems could advantageously be solved thanks to a rigorous control of the amount of unreacted scavengers present in the bed before polymerisation start-up. Whilst not wishing to be restricted to this embodiment, the Applicants believe that this has been made possible thanks to the control of the product of decomposition of the scavenger and catalyst poison as explained hereafter.

Thus, another object of the present invention is therefore a process for the polymerisation or copolymerisation of olefins by bringing the said olefins into contact with a catalyst under polymerisation or copolymerisation conditions in a reactor, which process comprises, prior to the introduction of the catalyst into the reactor, the introduction of a scavenger into the reactor which reacts with catalyst poison present, wherein the scavenger is added such that the level in the reactor of the product of decomposition of said scavenger and catalyst poison is controlled.

A polymerisation catalyst poison could be defined as a compound having a detrimental impact on the polymerisation of the reactive monomer by the catalyst. This detrimental impact can usually be easily identified because it delays, reduces, or even kills the polymerisation activity of the catalyst. The most common targeted polymerisation catalyst poison according to the present invention is water. Said catalyst poison will thus react with the scavenger to lead some product of decomposition.

A scavenger could be defined as a compound reacting with the polymerisation catalyst poison; the products issued from the reaction between the poison and the scavenger having a negligible or preferably no detrimental impact (or even a positive impact) on the polymerisation of the reactive monomer by the catalyst. The preferred scavengers used according to the present invention are metal alkyls. Said metal alkyls can be selected from the group comprising trialkyl metals (e.g. Triethylaluminium (TEA) and/or Triethylborane (TEB) and/or Triisobutylaluminium (TiBA)) and aluminoxanes (e.g. triisobutyl aluminoxane (TiBAO) and methylaluminoxanes (MMAO)), or mixtures thereof. The scavenger can be introduced into the reactor by any appropriate method. It can be introduced as a pure compound or, preferably, diluted in an organic solvent (for example in an alkane solvent like hexane); when diluted, said dilution can be performed over a wide range of concentrations.

The nature of the products of decomposition according to the present invention will obviously depend from the targeted poison(s) and the selected scavenger(s) used during the drying/cleaning procedure. The nature of the products of decomposition can be liquid, gas or solid. For the purpose of the present invention and appended claims, at least one product of decomposition is a gaseous product. The preferred products of decomposition according to the present invention are the alkanes corresponding to the metal alkyls used as scavengers, preferably methane and/or ethane and/or butane. The level in the reactor of the product of decomposition of the scavenger and the catalyst poison can be determined by any appropriate method. For example, it can advantageously be determined by using a gas chromatography technique in order to measure the content of the gaseous product of decomposition, e.g. methane and/or ethane and/or butane. The said measurement can be done continuously or semi-continuously, preferably online. A corresponding technique is detailed in the example which serves to illustrate the present invention.

In an alternative embodiment according to the present invention, there is provided a process for the polymerisation or copolymerisation of olefins by bringing the said olefins into contact with a catalyst under polymerisation or copolymerisation conditions in a reactor, which process comprises, prior to the introduction of the catalyst into the reactor, the introduction of a scavenger into the reactor which reacts with catalyst poison present, wherein the addition of the scavenger is performed as a series of sequential injections of scavenger, and said injections are continued until the increase in level in the reactor of the product of decomposition of said scavenger and catalyst poison during an individual addition of the scavenger is less than the expected amount of the product of decomposition corresponding to a complete reaction of all the scavenger added with poison.

In an alternative embodiment according to the present invention, there is provided a process for the polymerisation or copolymerisation of olefins by bringing the said olefins into contact, under polymerisation or copolymerisation conditions in a reactor system, which process comprises, prior to the introduction of the catalytic system in the reactor system:
  i) the introduction of a scavenger into the reactor system which reacts with the catalyst poison present, and
  ii) subsequently introducing a catalyst poison into the reactor system.

Indeed, the Applicants have also found that the monitoring of said decomposition product gives a precise indication of the catalyst poison content in the reaction system and therefore vital information about the required rate of introduction of scavenging compounds in the reactor system to allow an optimised cleaning/drying of the reactor system.

The scavenger can be added at any location of the polymerisation reactor. In the case of a gas phase fluidised bed process it can be introduced for example below the fluidisation grid or above the grid in the fluidised bed, above the fluidised bed, in the powder disengagement zone of the reactor (also named velocity reduction zone). According to an embodiment of the present invention, the scavenger is added directly into the fluidised bed, ideally in the lower part of the bed (below half bed height).

In the case of a slurry process, particularly a stirred tank process, the scavenger can be added directly into the slurry medium or into the gas phase above the slurry medium. In a slurry loop process the scavenger can be added at any point along the continuous loop reactor.

The amount of scavenger added to the polymerisation system is related to the amount of polymerisation catalyst poison present in the polymerisation reactor system. Thus, according to the present invention, the scavenger is added such that the level in the reactor of the product of decomposition of said scavenger and catalyst poison is controlled. The total amount of scavenger should ideally be at least equivalent to the exact quantity necessary to react with the total amount of poison present in the reactor system; however, as already explained before, there is no reliable method available for measuring the exact amount of poison present in the reactor system which in turns makes impossible to determine the exact amount of scavenger necessary for neutralising the said poison. Thus, the present invention circumvents this problem by controlling the level in the reactor of the product of decomposition of said scavenger and catalyst poison.

Said control can be done by any appropriate method.

According to an embodiment, the addition of the scavenger is done continuously at an appropriate rate; said addition is performed by controlling the level of product of decomposition. Said addition is stopped when the level of product of decomposition indicates that no more reaction occurs between the scavenger and the poison, i.e. when there is an indication that all the poison has been neutralised (hereinafter called the point "T1").

According to another embodiment, the addition of the scavenger can be performed as a series of sequential injections of the scavenger; the first injection of the scavenger is preferably made with an amount which is largely inferior to the expected amount needed to neutralise the total amount of poisons present. This will automatically generate an amount of product of decomposition which will be easily controlled by the operator as observed in the example. The amount of scavenger introduced during the subsequent injections can be related to the amount initially introduced or not. What is important for the operator is to control the level of product of decomposition.

The sequential injections of the scavenger is continued until the increase in level in the reactor of the product of decomposition of said scavenger and catalyst poison during an individual addition of the scavenger is less than (preferably less than ninety percent, for example less than seventy five percent, or even less than fifty percent of) the expected amount of the product of decomposition corresponding to a complete reaction of all the scavenger added with poison. The said expected amount can be determined according to any appropriate technique.

For example, said expected amount of the product of decomposition can be calculated as the theoretical amount of product of decomposition corresponding to a complete reaction of the entire scavenger added during the corresponding individual addition with poison. Alternatively, said expected amount of the product of decomposition can be in relation to the experimental value of said product of decomposition which is based on the previous addition of scavenger; for example, when two consecutive identical amounts of scavengers are added to the reactor during individual additions of said scavenger, the expected amount of the product of decomposition after the second addition is identical to the value of the previous content of the product of decomposition; when the amount of scavenger added to the reactor is less than the amount introduced during its previous addition, the man skilled in the art will perform a simple calculation to the value of the previous content of the product of decomposition in order to determine the expected amount of the product of decomposition. It will thus be obvious for the man skilled in the art that numerous alternative procedures can be developed based on the present invention, i.e. based on the control of the product of decomposition.

At this point (called hereinafter the point "T2"), and this is a preferred embodiment of the present invention, it is considered that enough scavenger has been added to the polymerisation system. Indeed, this control of the level of the product of decomposition has proven by experience to be satisfactory for guaranteeing a subsequent successful start-up of the polymerisation without experiencing the prior art problems highlighted above.

At this point T2, the remaining amount of scavenger (unreacted) is preferably comprised between 0.1 and 2.5 moles per ton of charge powder, more preferably between 0.3 and 2 moles per ton of charge powder.

In practice, the Applicant has found that the above methods could be further improved as explained hereafter. Indeed, as the so-called points "T1" and/or "T2" are representative of a complete reaction of the poison with the scavenger, it has been observed that these points could equally be representative of a concentration of scavenger in the reactor which is slightly superior to the preferred amount needed before starting up the polymerisation. Consequently, and this is another embodiment of the present invention, the addition of scavenger can advantageously be followed by an addition of polymerisation catalyst poison. This catalyst poison can be the same or different from the initial catalyst poison, preferably the same. The amount of catalyst poison added will again be preferably controlled by controlling the level of product of decomposition. After said additional introduction of catalyst poison, the remaining amount of scavenger (unreacted) is preferably comprised between 0.1 and 2.5 moles per ton of charge powder, more preferably between 0.3 and 2 moles per ton of charge powder.

The poison can be added at any location of the polymerisation reactor. In the case of a gas phase fluidised bed process it can be introduced for example below the fluidisation grid or above the grid in the fluidised bed, above the fluidised bed, in the powder disengagement zone of the reactor (also named velocity reduction zone). According to an embodiment of the present invention, the poison is added directly into the fluidised bed, ideally in the lower part of the bed (below half bed height). In the case of a slurry process, particularly a stirred tank process, the poison can be added directly into the slurry medium or into the gas phase above the slurry medium. In a slurry loop process the poison can be added at any point along the continuous loop reactor.

As indicated in the preamble, there are many different ways to proceed with poison (e.g. water) scavenging which have been explored by the man in the art. Hereafter are depicted some of these treatments that can advantageously be applied alongside the present invention.

For example, in a gas phase fluidised bed process, a pre start-up operation may be performed during or preferably before and/or after the introduction of the charge powder into the reactor.

This pre start-up operation is characterized in that, prior to the introduction of the catalytic system in the reactor, the reactor is subjected to a cleaning treatment comprising the introduction into the reactor of an alkane having from 4 to 8 carbon atoms; said treatment is preferably performed by circulating said alkane across the reactor under pressure and elevated temperature, followed by depressurizing and purging the reactor.

The charge powder used for the start-up of polymerisation or copolymerisation usually consists of solid particles of an inorganic product, such as silica, alumina, talc or magnesia, or else an organic product such as a polymer or copolymer. In particular the charge powder may be a polyolefin powder preferably of the same nature as that of the polyolefin powder to be produced, so that as soon as the reaction starts up, polyolefin of the desired quality is obtained immediately. Such a charge powder may in particular originate from a previous polymerisation or copolymerisation reaction. In this way one may use as charge powder a powder of a polyethylene, a polypropylene, a copolymer of ethylene with less than 20% by weight of one or more other alpha-olefins comprising, for example, from 3 to 12 carbon atoms, an elastomeric copolymer of ethylene with from 30 to 70% by weight of propylene, a copolymer of ethylene with less than 20% by weight of ethylene or one or more other alpha-olefins comprising from 4 to 12 carbon atoms, or a copolymer of propylene with from 10 to 40% by weight of 1-butene or a mixture of 1-butene and ethylene. Advantageously the charge powder consists of particles having a mean diameter by mass comprised between 200 and 5000 microns, and preferably comprised between 500 and 3000 microns. The size of the charge powder particles is chosen partly as a function of the size of the polyolefin particles to be produced, and partly as a function of the type of polymerisation reactor and conditions of use of this reactor, such as for example the speed of fluidisation which may for example be comprised between 2 to 10 times the minimum speed of fluidisation of the polyolefin particles to be produced.

The introduction of the alkane in a fluidised bed and/or with mechanical stirring, is preferably performed in the presence of an inert gas. In particular the treatment may be performed in the presence of nitrogen. It is also preferably performed under airtight conditions in order to avoid any oxygen ingress. It is also preferably performed in the absence of reacting gas like the olefins.

For the purpose of the present description and appended claims, "under pressure" treatment means that the pressure inside the reactor is at least above the atmospheric pressure. The alkane cleaning treatment is preferably carried out under a pressure comprised between 5 and 30 bars. For the purpose of the present description and appended claims, a treatment at an "elevated temperature" means that the treatment is performed at a reactor temperature of at least 40° C., preferably performed at a temperature comprised between 50 and 120° C. and more preferably at a temperature comprised between 70 and 110° C. Preferably, when a charge powder is present, the treatment temperature should be below the temperature at which the particles of charge powder begin to soften and form agglomerates.

The alkane is for example, butane, pentane, hexane, heptane or octane. Pentane is preferably used.

The quantity of alkane used according to the invention depends on the state of purity of both the reactor loop and the charge powder. Preferably, the quantity of alkane used for the treatment is such that the alkane partial pressure is comprised between 25 and 95% of the saturated vapor pressure of the said alkane under the treatment conditions (temperature and pressure). More preferably, the quantity of alkane used for the treatment is such that the alkane partial pressure is comprised between 45 and 75% of the saturated vapor pressure of the said alkane under the treatment conditions (temperature and pressure).

In order to provide the most efficient cleaning treatment, it is important that this treatment should last at least five minutes and preferably over 15 minutes. It has been observed, in fact, that when the duration of the treatment is less than 5 minutes, the polymerisation or copolymerisation reaction does not start up immediately when the alpha-olefins are brought into contact with the charge powder in the presence of the catalyst system.

As already indicated, the pre start-up cleaning process includes after the alkane circulation under pressure a depressurizing step. Then, the consecutive purge operation(s) is/are performed according to techniques in themselves known, such as successive operations of pressurising and degassing the reactor by means of gases or a mixture of gases as referred to above. They may be carried out under a pressure at least equal to atmospheric pressure, preferably under a pressure comprised between 0.1 and 5 MPa, at a temperature equal to or greater than 0 DEG C., but less than the temperature at which the charge powder particles begin to soften and form agglomerates, and preferably at a temperature comprised between 40 DEG and 120 DEG C.

According to a preferred embodiment, when a pre start-up alkane treatment is performed, it is performed prior to the scavenging sequence and the alkane used in the treatment is different from the product of decomposition controlled according to the present invention.

According to an embodiment of the present invention, the scavenger cleaning/drying treatment can be performed as a pre start-up operation during or before and/or after the introduction of the charge powder into the reactor, preferably after the introduction of the charge powder into the reactor.

The introduction of the scavenger in a fluidised bed and/or with mechanical stirring reactor is preferably performed in the presence of an inert gas. In particular the scavenger treatment may be performed in the presence of nitrogen. It is also preferably performed under airtight conditions in order to avoid any oxygen ingress. It is also preferably performed in the absence of reacting gas like the olefins.

The scavenger cleaning/drying treatment is preferably carried out under a pressure comprised between 5 and 30 bars, preferably between 10 and 20 bars. According to an embodiment of the present invention the addition of the scavenger under pressure is followed by a depressurisation sequence (e.g. by lowering the prevailing reactor pressure by at least 50%) in order to purge some of the product of decomposition; for example, this can be performed after each individual addition of scavenger as previously described. The scavenger cleaning/drying treatment is preferably carried out at a reactor temperature of at least 40° C., preferably performed at a temperature comprised between 50 and 120° C. and more preferably at a temperature comprised between 75 and 110° C. Preferably, when a charge powder is present, the treatment temperature should be below the temperature at which the particles of charge powder begin to soften and form agglomerates.

For example, the scavenger can be chosen amongst organoaluminium compounds of the formula AlRn X3-n in which R is an alkyl group comprising from 2 to 12 carbon atoms, X is a hydrogen or halogen atom, or an alcoholate group, and n is a whole number or fraction comprised between 1 and 3. Said organoaluminium treatment is thus preferably performed after the alkane treatment.

The organoaluminium compound may advantageously be chosen from amongst the trialkylaluminium compounds or hydrides, chlorides or alcoholates of alkylaluminium. Generally it is preferred to use a trialkylaluminium such as triethylaluminium, trisobutylaluminium, tri-n-hexyl-aluminium or tri-n-octyl aluminium. In certain cases, the organoaluminium compound may advantageously be of the same nature as that used as co-catalyst associated with the catalyst in the catalyst system; however, it will become apparent for the man skilled in the art that the present invention is particularly attractive when the scavenger is of a different nature than the co-catalyst associated with the catalyst in the catalyst system.

Another additional treatment according to the present invention could be an additional dehydration treatment, which essentially consists in purge operations. If used, said additional dehydration treatment is advantageously performed before the optional alkane cleaning treatment, and before the scavenger addition of the present invention.

According to a preferred embodiment of the present invention, the cleaning/drying treatments (purges, alkanes and scavengers) are performed before composing the reacting gas phase. Then, contacting the olefins with the charge powder in the presence of the catalytic system may be performed in a manner in itself known, by means of a polymerisation or copolymerisation reactor with a fluidized bed and/or with mechanical stirring. The reactor is fed with a reaction gas mixture consisting of 1 or more (alpha)-olefins and optionally hydrogen and/or one or more inert gases (including additional optional alkanes), under the conditions of the polymerisation or copolymerisation reaction in the gas phase, that is to say under a pressure generally comprised between 0.1 and 5 MPa, preferably comprised between 0.5 and 4 MPa, and at a temperature generally comprised between 0 DEG and 125 DEG C., preferably comprised between 40 DEG and 120 DEG C. Finally, the catalyst is introduced into the reactor and the reaction starts immediately.

Surprisingly, it has been observed that when one wishes to attain in an advantageous manner, in a relatively short time, a stable production of polyolefin of the desired quality, it is possible thanks to the process of the invention to perform the initial stage of the polymerisation or copolymerisation in the presence of the catalytic system in a relatively large quantities, without forming agglomerates or fine particles.

The process of the present invention can take place in any appropriate reactor, e.g. a gas phase reactor, a gas/liquid phase reactor or a slurry reactor.

When the olefin polymerisation reaction is in slurry phase, the reactor is preferably a slurry loop reactor. Slurry phase polymerisation of olefins is well known wherein an olefin monomer and an olefin comonomer are polymerised in the presence of a catalyst in a diluent in which the solid polymer product is suspended and transported. Liquid full loop reactors are particularly well known in the art and are described for example in U.S. Pat. Nos. 3,152,872, 3,242,150 and 4,613,484.

Polymerisation is typically carried out at temperatures in the range 50-125 degrees C. and at pressures in the range 1-100 bara. The catalyst used can be any catalyst typically used for olefin polymerisation such as chromium oxide, Ziegler-Natta or metallocene-type catalysts. The product slurry comprising polymer and diluent, and in most cases catalyst, olefin monomer and comonomer can be discharged intermittently or continuously, optionally using concentrating devices such as hydrocyclones or settling legs to minimise the quantity of fluids withdrawn with the polymer.

The loop reactor is of a continuous tubular construction comprising at least two, for example four, vertical sections and at least two, for example four, horizontal sections. The heat of polymerisation is typically removed using indirect exchange with a cooling medium, preferably water, in jackets surrounding at least part of the tubular loop reactor. The volume of the loop reactor can vary but is typically in the range 20 to 120 cubic meters.

When polymerisation reaction is in the gas phase, which is a preferred embodiment of the present invention, the process may be carried out in a stirred and/or gas fluidised bed. Gas phase polymerisation of a mixture of polymerisable olefin to produce normally solid polymer substances using a quench-cooled, gas-phase polymerisation reactor containing a sub-fluidised particulate bed of polymerised olefin has been described in a number of patents including: U.S. Pat. Nos. 3,957,448, 3,965,083 and 3,971,768. These U.S. Patents describe polymerisation processes and apparatus in which polymer is formed from gaseous olefin in horizontal stirred-bed vessels.

According to the most preferred embodiment of the present invention, the polymerisation process of the present invention is carried out continuously in the gas phase in a fluidised-bed reactor. Such processes are well-known, and examples include EP 0 475 603, EP 1 240 217, EP 1 484 344 and EP 0 855 411.

In such processes, the particles of polymer being formed are maintained in the fluidised state by virtue of a reaction gas mixture containing the monomer(s) to be polymerised travelling in a rising stream. The polymer thus manufactured in powder form is generally drained from the reactor in order to keep the bed of fluidised polymer particles at a more or less constant volume. The process generally employs a fluidisation grid which distributes the reaction gas mixture through the bed of polymer particles and which acts as a support for the bed in the event of a cut in the flow of the rising gas. The reaction gas mixture leaving at the top of the fluidised-bed reactor is recycled to the base of the latter under the fluidisation grid by means of an external circulation conduit.

The polymerisation of the olefins is an exothermic reaction. The reaction mixture comprising the olefins to be polymerised is generally cooled by means of at least one heat exchanger arranged on the outside of the reactor before being recycled.

Liquid, especially but not limited to liquid condensed from the cooled reaction mixture during recycle, may be injected in the reaction zone. Vaporisation of the liquid in the reaction zone provides the effect of cooling directly in the reaction zone.

The process of the invention is particularly suitable for very large industrial reactors; in accordance with one embodiment of the present invention, the reactor used makes it possible to produce quantities of polymer of more than 3000 kg/h, preferably more than 10,000 kg/h. The process of the invention is further particularly suitable for high space time yields (in terms of weight of polymer produced per unit volume of reactor space per unit time) in commercial gas fluidised bed reactors; consequently, according to a further embodiment of the present invention, space time yields are higher than 25 kg/m$^3$/h, preferably higher than 50 kg/m$^3$/h, more preferably higher than 80 kg/m$^3$/h. The Space Time Yield (STY) expressed in [kg/(m$^3$×h)] is well known and represents the weight of polymer produced per unit of time and per unit of reactor volume. The weight of polymer production per unit of time can also advantageously be calculated as the average steady (co)monomers feed rate (ignoring therefore the slight fluctuations due to (co)monomers losses, e.g. purges). In an embodiment of the present invention, the charge powder is an olefin polymer charge powder in a vertical cylindrical fluidised bed reactor wherein the charge powder represents at least 50 tons, preferably at least 100 tons, more preferably at least 150 tons.

Fluidized-bed reactors according to the present invention can be represented by a first volume, the enclosure (wall) of which consists of at least one surface of revolution generated by the rotation around a vertical axis known as axis of revolution, of a rectilinear and/or curved segment, above which is preferably mounted a second volume, commonly called a disengagement vessel, the enclosure (wall) of which also consists of at least one surface of revolution generated by the rotation, around the same vertical axis known as axis of revolution, of a rectilinear and/or curved segment. According to its definition of disengagement vessel, the orthogonal section of the second volume (at the location situated just above the junction between the two volumes) is higher than the orthogonal section of the first volume (at the location situated at its upper point).

Conventional fluidized-bed reactors employed for the gas phase polymerization of olefin(s) usually consist of a cylinder of diameter "D" and height "H" with a vertical axis above which is preferably mounted a disengagement vessel.

The known essential function of the disengagement vessel is to slow down the rising gas stream which, after having passed through the fluidized bed, can entrain relatively large quantities of solid particles. As a result, most of the entrained solid particles return directly into the fluidized bed. Only the finest particles can be entrained out of the reactor.

In principle, the fluidized bed could occupy all of the cylindrical part of the reactor, a part which rises over a height H starting from the base of the fluidized bed, which generally coincides with the fluidization grid. In practice the fluidized bed generally can occupy only a portion of the cylindrical part of the fluidized-bed reactor, with the result that the real height of the fluidized bed (h) is equivalent to 0.85×H, preferably 0.90×H, and in particular 0.95×H; the fluidized bed may also occupy at least partially the second volume of the reactor, e.g. a real height of the fluidised (h) bed equivalent to H, or 1.05×H, or 1.10×H, or even 1.15×H. The real height of the fluidised bed (h) may also vary during the polymerisation process, e.g. with fluctuations preferably remaining within ranges made by any of the above indicated values.

The principal olefin according to the present invention is preferably ethylene or propylene. Ethylene or propylene preferably represents more than 50% by weight of the polymer produced.

When used, comonomer olefins are preferably selected from alpha-olefins having 2 to 12 carbon atoms. Suitable comonomer olefins are ethylene, propylene, 1-butene, 1-hexene, 4-methyl-1-pentene and 1-octene. Preferably, the principal olefin is ethylene and the comonomer is 1-butene, 1-hexene or 1-octene. Alternatively, the principal olefin can be propylene and the comonomer ethylene.

The reaction mixture may also comprise one or more inert compounds, especially inert gases such as nitrogen, and/or one or more saturated hydrocarbons such as ethane, propane, butane, pentane and hexane.

The process according to the present invention may be used to prepare a wide variety of polymer products, e.g. polypropylene, linear low density polyethylene (LLDPE), LLDPE especially based on copolymers of ethylene with 1-butene, 1-hexene or 1-octene. This process is particularly suitable for the production of very low density polyethylene (VLDPE). A further suitable polyethylene product is high density polyethylene (HDPE), especially copolymers of ethylene with a small portion of higher alpha olefin, for example, 1-butene, 1-pentene, 1-hexene or 1-octene.

The polymerisation process according to the present invention is particularly suitable for polymerising olefins in the gas phase at an absolute pressure of between 0.5 and 6 MPa and at a temperature of between 30° C. and 130° C. For example, for LLDPE production the temperature is suitably in the range 75-100° C. and for HDPE the temperature is typically 80-115° C. depending on the activity of the catalyst used and the polymer properties desired.

The total pressure in the gas phase polymerisation reactor is most preferably between 1.5 and 3 MPa.

The resulting polymers may be used in a number of applications such as film extrusion, both cast and blown film extrusion and both injection and rotomolding applications, blow moulding and pipe. Typically the polymer may be compounded with the usual additives including heat and light stabilizers such as hindered phenols; ultra violet light stabilizers such as hindered amine light stabilizers (HALS); process aids such as fatty acids or their derivatives and fluoropolymers optionally in conjunction with low molecular weight esters of polyethylene glycol.

The process of the present invention may be applied to polymerisation processes using any suitable polymerisation catalyst, including Ziegler-Natta type catalysts, chromium oxide type catalysts, and metallocene type catalysts.

The (co-)polymerisation may therefore be carried out, for example, in the presence of a catalyst of Ziegler-Natta type comprising at least one transition metal in combination with a cocatalyst comprising an organometallic compound, for example an organoaluminium compound. The catalyst essentially comprises an atom of a transition metal selected from the metals of groups IV to VI of the periodic classification of the elements, such as titanium, vanadium, chromium, zirconium or hafnium, optionally a magnesium atom and a halogen atom. The catalyst may be supported on a porous refractory oxide such as silica or alumina or may be combined with a solid magnesium compound, such as the chloride, the oxide, the hydroxy chloride or an alcoholate of magnesium. By way of example, mention may be made of the catalysts described in the U.S. Pat. No. 4,260,709, EP 0 598 094, EP 0 099 774 and EP 0 175 532. The present invention is also particularly appropriate for silica-supported Ziegler catalysts, for example those described in Patents WO 93/09147, WO 95/13873, WO 95/34380, WO 99/05187 and U.S. Pat. No. 6,140,264. The catalyst can be used as it is or optionally in the form of a coated catalyst or prepolymer containing, for example, from $10^{-5}$ to 3, preferably from $10^{-3}$ to $10^{-1}$, millimoles of transition metal per gram of polymer; it can be used together with a cocatalyst or activator, e.g. an organometallic compound of a metal from groups I to III of the Periodic Classification of the Elements, such as, for example, an organoaluminium compound. It is also possible to use a catalyst complexed by a metal selected from those of group VIII of the periodic classification of the elements, such as, for example, nickel, iron or cobalt. By way of examples, mention may be made of those described in Patent Application WO 98/27124 or WO 98/2638. It is also possible to use catalysts based on platinum or palladium as the transition metal; complexes of this type are described, for example, in the Patent WO 96/23010.

The (co-)polymerisation may preferably be carried out in the presence of a chromium oxide catalyst. Examples of chromium oxide catalysts are typically those comprising a refractory oxide support which is activated by a heat treatment advantageously carried out at a temperature of at least 250° C. and at most equal to the temperature at which the granular support begins to sinter and under a non-reducing atmosphere and preferably an oxidising atmosphere. This catalyst can be obtained by a great number of known process, in particular by those according to which, in a first stage, a chromium compound, such as a chromium oxide, generally of formula CrO3, or a chromium compound which can be converted by calcination into chromium oxide, such as, for example, a chromium nitrate or sulphate, an ammonium chromate, a chromium carbonate, acetate or acetylacetonate, or a tert-butyl chromate, is combined with a granular support based on refractory oxide, such as, for example, silica, alumina, zirconium oxide, titanium oxide or a mixture of these oxides or aluminium or boron phosphates or mixtures in any proportion of these phosphates with the above mentioned oxides. In a second stage, the chromium compound thus combined with the granular support is subjected to a so-called activation operation by heat treatment in a non-reducing atmosphere and preferably an oxidising atmosphere at a temperature of at least 250° C. and at most that at which the granular support begins to sinter. The temperature of the heat treatment is generally between 250° C. and 1200° C. and preferably between 350 and 1000° C. Such catalyst preferably contains from 0.05 to 5%, more preferably from 0.1 to 2%, by weight of chromium; it can contain, in addition to the chromium, from 0.1 to 10% of titanium in the form of titanium oxide and/or fluorine and/or aluminium, in particular in the form of aluminium oxide; it can be used as it is or optionally in the form of a coated catalyst or prepolymer containing, for example, from $10^{-5}$ to 3, preferably from $10^{-3}$ to $10^{-1}$, millimoles of chromium per gram of polymer. The chromium oxide catalysts may be used together with a cocatalyst or activator, e.g. an organometallic compound of a metal from groups I to III of the Periodic Classification of the Elements, such as, for example, an organoaluminium compound. Examples of catalysts can be found, for example, in EP 0 275 675, EP 0 453 116, or WO 99/12978.

The process of the present invention is also preferably applied to a polymerisation process in which the catalyst is a metallocene-type catalyst.

With regards to particular metallocene-type catalysts, mention may be made, by way of example, of those corresponding to the formula

[L]$_m$M[A]$_n$ where L is a bulky ligand; A is a leaving group, M is a transition metal and m and n are such that the total valency of the ligand corresponds to the valency of the transition metal.

The ligands L and A may be bridged. L is generally a ligand of the cyclopentadienyl type.

Examples of metallocene catalysts of this type are described in U.S. Pat. Nos. 4,530,914, 5,124,418, 4,808,561, 4,897,455, 5,278,264, 5,278,119, 5,304,614, and EP 0 129 368, EP 0 591 756, EP 0 520 732, EP 0 420 436, WO 91/04257, WO 92/00333, WO 93/08221, WO 93/08199.

It is also possible to use with advantage the metallocene-based catalyst systems as described in U.S. Pat. Nos. 4,871,705, 4,937,299, 5,324,800, 5,017,714, 5,120,867, 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP 0 561 476, EP 0 279 586, EP 0 594 218, WO 94/10180 and WO 2006/085051.

Mention may also be made of the Patents WO 92/00333, WO 94/07928, WO 91/04257, WO 94/03506, U.S. Pat. Nos. 5,057,475, 5,096,867, 5,055,438, 5,198,401, 5,227,440, 5,264,405, EP-A-0 420 436, U.S. Pat. Nos. 5,604,802, 5,149,819, 5,243,001, 5,239,022, 5,276,208, 5,296,434, 5,321,106, 5,329,031, 5,304,614, WO 93/08221, WO 93/08199 and EP 0 578 838. The preferred transition metal compounds of the catalyst are those of group 4, in particular zirconium, titanium and hafnium.

The metallocene catalyst may also be represented by the general formula (Cp)m MRnR'p, where Cp is a ring of the cyclopentadienyl type, M is a transition metal of group 4, 5 or 6; R and R' may be selected from halogens and hydrocarbyl or hydrocarboxyl groups; m=1-3, n=0-3, p=0-3 and the sum m+n+p equals the oxidation state of M; preferably, m=2, n=1 and p=1.

The metallocene catalyst may be also represented by the general formula (C5R'm)pR"s(C5R'm)MeQ3-p-x, or R"s(C5R'm)2MeQ' where Me is a transition metal of group 4, 5 or 6, at least one C5 R'm is a substituted cyclopentadienyl, each R', which may be identical or different, is hydrogen, an alkyl, alkenyl, aryl, alkylaryl or arylalkyl radical having 1 to 20 carbon atoms, or two carbon atoms linked together to form part of a substituted or unsubstituted ring having 4 to 20 carbon atoms, R" is a radical containing one or more or a combination of carbon, germanium, silicon, phosphorus or nitrogen atoms which bridges two rings (C5 R'm), or which bridges one ring (C5 R'm) to M, when p=0, x=1, else "x" is always 0, each Q, which may be identical or different, is an alkyl, alkenyl, aryl, alkylaryl or arylalkyl radical having 1 to 20 carbon atoms, a halogen or an alkoxide, Q' is an alkylidene radical having 1 to 20 carbon atoms, s is 0 or 1, and when s is 0, m is 5 and p is 0, 1 or 2 and when s is 1, m is 4 and p is 1.

The metallocene catalysts are generally used with an activator or cocatalyst. Examples which may be mentioned include alumoxane and/or ionic or neutral ionising activators, or compounds such as pentafluorophenyl tri(n-butyl) ammonium tetraborate or the boric metalloid precursor of trisperfluorophenyl, which ionises the neutral metallocene compound. Compounds of this type are described in EP 0 570 982, EP 0 520 732, EP 0 495 375, EP 0 426 637, EP 0 500 944, EP 0 277 003, EP 0 277 004, U.S. Pat. Nos. 5,153,157, 5,198,401, 5,066,741, 5,206,197 and 5,241,025, and WO 94/07928.

Catalyst combinations may also be used, for example those described in U.S. Pat. Nos. 5,281,679, 4,701,432, 5,124,418, 5,077,255 and 5,183,867.

Other examples of metallocene catalysts are described in Patents EP 0 593 083, U.S. Pat. Nos. 5,317,036, 4,937,217, 4,912,075, 4,935,397, 4,937,301, 4,914,253, 5,008,228, 5,086,025, 5,147,949, 4,808,561, 4,897,455, 4,701,432, 5,238,892, 5,240,894, 5,332,706, WO 95/10542, WO 95/07939, WO 94/26793 and WO 95/12622.

Preferably, the metallocene comprises

A) an inert support,

B) a group 4-10 metal complex corresponding to the formula:

where M is a metal of one of groups 4 to 10 of the Periodic Table of the Elements, Cp is an anionic ligand group, Z is a divalent moiety linked to Cp and linked to M, comprising boron or an element of group 14 of the Periodic Table of the Elements, and further comprising nitrogen, phosphorus, sulphur or oxygen;

X is a neutral conjugated diene ligand group having up to 60 atoms, or a dianionic derivative, and C) an ionic cocatalyst capable of converting the metal complex into an active polymerisation catalyst.

Examples of cocatalysts are described in U.S. Pat. Nos. 5,132,380, 5,153,157, 5,064,802, 5,321,106, 5,721,185 and 5,350,723. Mention may also be made of the complexes described in WO 96/28480 and WO 98/27119.

The catalyst may be used in the form of a prepolymer prepared beforehand during a prepolymerisation step from catalysts described above. The prepolymerisation may be carried out by any process, for example a prepolymerisation in a liquid hydrocarbon or in gas phase in accordance with a batchwise, semicontinuous or continuous process.

The catalyst or the prepolymer may be introduced in the reactor continuously or discontinuously, preferably continuously.

The present invention has been described in conjunction with specific embodiments thereof; the description cited above is intended to illustrate the present invention and not limit its scope. Additional aspects, advantages and modifications will be apparent to the man skilled in the art.

The following examples are intended to give to the man skilled in the art a full disclosure and description of how to reproduce the invention, and is not intended to limit the scope of the present invention.

EXAMPLE 1

The example illustrates the possibility to scavenge water poison with triethylaluminium (TEA), the gas product decomposition resulting from the reaction to follow is the Ethane and one solid co-product is also generated, i.e. alumina dioxide.

In the following, we illustrate how from the Gas Chromatography (GC) measurements (i.e. ppm ethane) and knowing the reactor conditions (pressure P and temperature T) we can determine the ethane pressure ($P_{ETHANE}$) in the reactor and to conclude on the amount of triethylaluminium which has not reacted (EXCESS_TEA).

For a commercial unit these two parameters, $P_{ETHANE}$ and EXCESS_TEA, are online monitored.

In this present example, some precise values and order of magnitude are given for a pilot plant reactor.

Relationship between Pressure Ethane calculation and moles of Ethane generated via the GC measurements GC Measurements Ethane detection in ppm under Standard Pressure and Temperature $$\text{Equivalent: } ppm = \frac{V_{ETHANE} * 10^6}{V_{GAS}} = \frac{n_{ETHANE} * 10^6}{n_{GAS}}$$

wherein η is the amount of gas in moles
Reactor Conditions
Pressure range: P=10-20 bars
Temperature range: T=75-110° C.
Reactor gas loop volume: $V_{loop}$=10 m³
Calculation: Gas molar volume, $$V_m = \frac{R*T}{P}$$

wherein R is the universal gas constant
Chemistry
1 moles of TEA reacts with 3 moles of water and generates 3 moles of ethane
Relationship moles of Ethane generated (measured by GC) and Partial Ethane pressure (value calculated)

$$P_{ETHANE} = \frac{R*T}{V_{loop}} * n_{ETHANE} = \frac{R*T}{V_{loop}} * n_{GAS} * ppm * 10^{-6} =$$

$$\frac{R*T}{V_{loop}} * \frac{V_{loop}}{V_m} * ppm * 10^{-6} = \frac{R*T}{V_{loop}} * \frac{V_{loop}}{\frac{R*T}{P}} * ppm * 10^{-6} \text{ Thus:}$$

$$P_{ETHANE} = P * ppm * 10^{-6} \text{ and } P_{ETHANE} = \frac{R*T}{V_{loop}} * n_{ETHANE}$$

TEA Excess
Volume TEA introduced, V
Concentration TEA, C=0.5 mol/L
Theoretical pressure if all the TEA introduced is consumed:

$$P_{theoretical} = \frac{R*T}{V_{loop}} * 3 * V * C$$

3 represents the stoechiometric coefficient of Ethane production for the TEA/Water reaction We can conclude on the molar TEA excess, Excess_TEA in the loop as described below:

$$\text{Excess\_TEA} = \frac{1}{3} * \frac{V_{loop}}{R*T} * (P_{theoretical} - P_{ETHANE}) = V*C - \frac{1}{3}\frac{V_{loop}}{R*T} * P_{ETHANE}$$

Some Values
1 mole of TEA which reacts completely with 3 moles of water will generate 3 moles of Ethane:
P=10 bar T=70° C.→$P_{ETHANE}$=8.67 mbar
P=10 bar T=110° C.→$P_{ETHANE}$=9.55 mbar

EXAMPLE 2

Pilot Scale Process Operation

A fluidised bed reactor 74 cm in diameter was used for the gas phase co-polymerisations of olefins. In the illustrated example, the catalyst is a Metallocene silica supported, oxygen and water sensitive.

The purification of the pilot plant loop and the polyethylene polymer bed, used as the charge bed, is a crucial step (in particular with Metallocene or chromium oxide type catalysts).

After the pressure swing in the empty reactor to remove oxygen content below 1 ppm, firstly 2.3 moles of TEA are injected on the empty reactor and was consumed as proven by the measured GC values of ethane corresponding to the expected value for the complete stoichiometric reaction between TEA and water (clear indication that all of the TEA reacted with the poison). Secondly two TEA injections are performed after the start-up bed loading (as detailed hereafter); the powder bed has a weight of 0.75 ton. GC measurements were performed intermittently after each injection of scavenger in order to detect and calculate the content of gaseous product of decomposition (e.g. ethane when ethyl Al compounds are used as scavenger).

Thus, two consecutive additions of 1 mole of TEA were added to the reactor bed. Said additions were performed under fluidised conditions (circulation loop) at a temperature of 70° C. and a pressure of 10 bar.

A purge was also performed after each injection (and ethane measurement) in order to remove the ethane formed.

The first injection lead to a measured GC value of ethane corresponding to the expected value for the complete stoichiometric reaction between TEA and water giving a clear indication that all of the TEA reacted with the poison. The second injection lead to a measured GC value of ethane which was less than the previously measured amount; its value was 55% of the previously measured GC value.

At this point, the treatment was stopped—the calculation of the remaining amount of TEA per ton of charge powder gave a value of 0.6 mole per ton of charge powder—and the polymerisation proceeded by composing the reacting gas phase and the catalyst injections (in this instance a Metallocene silica supported catalyst).

The start-up could be made without upsets and the polymerisation could proceed successfully without formation of agglomerates or any sign other of fouling.

Similar procedures (with different number of injections and/or with different quantities of TEA added per injection) were repeated successfully several times during similar cleaning/start-up process with the same pilot plant catalyst system.

In the absence of this procedure, unreliable start-ups were encountered, leading to longer durations of the start-up phases, fouling of the reactor, and even including occasional reactor shutdowns.

EXAMPLE 3

Pilot Scale Process Operation

A fluidised bed reactor 74 cm in diameter was used for the gas phase co-polymerisations of olefins. In the illustrated example, the catalyst is a Metallocene silica supported, oxygen and water sensitive.

The purification of the pilot plant loop and the polyethylene polymer bed, used as the charge bed, is a crucial step (in particular with Metallocene or chromium oxide type catalysts).

After the pressure swing in the empty reactor to remove oxygen content below 1 ppm, firstly 2.3 moles of TEA are injected on the empty reactor and was consumed as proven by the measured GC values of ethane (clear indication that all of the TEA reacted with the poison). Secondly several TEA injection are performed after the start-up bed loading.

GC measurements were performed intermittently after each injection of scavenger in order to detect and calculate the content of gaseous product of decomposition (e.g. ethane when ethyl Al compounds are used as scavenger).

Three consecutive additions of TEA were added to the reactor bed; the first two injections were each of 1 mole of TEA and the third injection was of 2.25 moles of TEA (as detailed hereafter); the powder bed has a weight of 0.75 ton. Said additions were performed under fluidised conditions (circulation loop) at a temperature of 70° C. and a pressure of 10 bar.

A purge was also performed after each injection in order to remove the ethane formed.

The first two injections lead to similar measured GC values of ethane corresponding to the expected value for the complete stoichiometric reaction between TEA and water giving a clear indication that all of the TEA reacted with the poison. The third injection lead to a measured GC value of ethane which was less than the previously measured amount; its value was 13.4% of the previously measured GC value.

At this point, the TEA treatment was stopped—the calculation of the remaining amount of TEA per ton of charge powder gave a value of 2.6 mole per ton of charge powder. Consequently, an amount of 2.25 moles of water was injected directly in the bed through the fluidisation grid supporting the bed—the calculation of the remaining amount of TEA per ton of charge powder gave a value of 1.6 mole per ton of charge powder. Then, the polymerisation proceeded by composing the reacting gas phase and the catalyst injections (in this instance a Metallocene silica supported catalyst).

The start-up could be made without upsets and the polymerisation could proceed successfully without formation of agglomerates or any sign other of fouling.

The invention claimed is:

1. Process for the polymerisation or copolymerisation of olefins by bringing the said olefins into contact with a catalyst under polymerisation or copolymerisation conditions in a reactor comprising a charge powder, which process comprises, prior to the introduction of the catalyst into the reactor, the introduction of a scavenger into the reactor which reacts with catalyst poison present, wherein the scavenger is added to the reactor until the charge powder comprises a remaining amount of scavenger comprised between 0.1 and 2.5 moles per ton of charge powder.

2. Process for the polymerisation or copolymerisation of olefins by bringing the said olefins into contact with a catalyst under polymerisation or copolymerisation conditions in a reactor, which process comprises, prior to the introduction of the catalyst into the reactor, the introduction of a scavenger into the reactor which reacts with catalyst poison present, wherein the scavenger is added such that the level in the reactor of the product of decomposition of said scavenger and catalyst poison is controlled.

3. Process for the polymerisation or copolymerisation of olefins by bringing the said olefins into contact with a catalyst under polymerisation or copolymerisation conditions in a reactor, which process comprises, prior to the introduction of the catalyst into the reactor, the introduction of a scavenger into the reactor which reacts with catalyst poison present, wherein the addition of the scavenger is performed as a series of sequential injections of scavenger, and said injections are continued until the increase in level in the reactor of the product of decomposition of said scavenger and catalyst poison during an individual addition of the scavenger is less than the expected amount of the product of decomposition corresponding to a complete reaction of all the scavenger added with poison.

4. Process for the polymerisation or copolymerisation of olefins by bringing the said olefins into contact, under polymerisation or copolymerisation conditions in a reactor system, which process comprises, prior to the introduction of the catalytic system in the reactor system:
  i) the introduction of a scavenger into the reactor system which reacts with the catalyst poison present, and
  ii) subsequently introducing a catalyst poison into the reactor system'wherein the catalyst poison is water, and the scavenger addition is performed after the introduction of the charge powder into the reactor.

5. Process according to claim 1 wherein the catalyst poison is water.

6. Process according to claim 1 wherein the scavenger is selected from the group consisting of trialkylaluminium compounds, hydrides, chlorides or alcoholates of alkylaluminium, other trialkyl metal compounds, aluminoxanes and mixtures thereof.

7. Process according to claim 1 wherein the reactor is a gas phase reactor.

8. Process according to claim 1 wherein a cocatalyst is used in combination with the catalyst, the cocatalyst being an organometallic compound.

9. Process according to claim 1 wherein the principal olefin is ethylene and/or propylene.

10. Process according to claim 2 wherein the catalyst poison is water.

11. Process according to claim 2 wherein the scavenger addition is performed after the introduction of the charge powder into the reactor.

12. Process according to claim 2 wherein the remaining amount of scavenger (unreacted) is comprised between 0.1 and 2.5 moles per ton of charge powder.

13. Process according to claim 2 wherein the scavenger is selected from the group consisting of trialkylaluminium componds, hydrides, chlorides or alcoholates of alkylaluminium, other trialkyl metal compounds, aluminoxanes and mixtures thereof.

14. Process according to claim 2 wherein the reactor is a gas phase reactor.

15. Process according to claim 2 wherein a cocatalyst is used in combination with the catalyst, the cocatalyst being an organometallic compound.

16. Process according to claim 2 wherein the principal olefin is ethylene and/or propylene.

17. Process according to claim 3 wherein the catalyst poison is water.

18. Process according to claim 3 wherein the scavenger addition is performed after the introduction of the charge powder into the reactor.

19. Process according to claim 3 wherein the remaining amount of scavenger (unreacted) is comprised between 0.1 and 2.5 moles per ton of charge powder.

20. Process according to claim 3 wherein the scavenger is selected from the group consisting of trialkylaluminium compounds, hydrides, chlorides or alcoholates of alkylaluminium, other trialkyl metal compounds, aluminoxanes and mixtures thereof.

21. Process according to claim 3 wherein the reactor is a gas phase reactor.

22. Process according to claim 3 wherein a cocatalyst is used in combination with the catalyst, the cocatalyst being an organometallic compound.

23. Process according to claim 3 wherein the principal olefin is ethylene and/or propylene.

24. Process according to claim 4 wherein the remaining amount of scavenger (unreacted) is comprised between 0.1 and 2.5 moles per ton of charge powder.

25. Process according to claim 4 wherein the scavenger is selected from the group consisting of trialkylaluminium compounds, hydrides, chlorides or alcoholates of alkylaluminium, other trialkyl metal compounds, aluminoxanes and mixtures thereof.

26. Process according to claim 4 wherein the reactor is a gas phase reactor.

27. Process according to claim 4 wherein a cocatalyst is used in combination with the catalyst, the cocatalyst being an organometallic compound.

28. Process according to claim 4 wherein the principal olefin is ethylene and/or propylene.

29. Process according to claim 1 wherein the scavenger is added to the reactor until the charge powder comprises a remaining amount of scavenger comprised between 0.3 and 2 moles per ton of charge powder.

30. Process according to claim 7 wherein the reactor is a fluidised bed gas phase reactor.

31. Process according to claim 12 wherein the remaining amount of scavenger (unreacted) is comprised between 0.3 and 2 moles per ton of charge powder.

32. Process according to claim 14 wherein the reactor is a fluidised bed gas phase reactor.

33. Process according to claim 19 wherein the remaining amount of scavenger (unreacted) is comprised between 0.3 and 2 moles per ton of charge powder.

34. Process according to claim 21 wherein the reactor is a fluidised bed gas phase reactor.

35. Process according to claim 24 wherein the remaining amount of scavenger (unreacted) is comprised between 0.3 and 2 moles per ton of charge powder.

36. Process according to claim 26 wherein the reactor is a fluidised bed gas phase reactor.

* * * * *